(12) United States Patent
Ueda et al.

(10) Patent No.: US 9,694,513 B2
(45) Date of Patent: Jul. 4, 2017

(54) KNEADING APPARATUS AND METHOD FOR PRODUCING SEMICONDUCTOR ENCAPSULATING RESIN COMPOSITION

(75) Inventors: Shigehisa Ueda, Tokyo (JP); Kazuo Noda, Tokyo (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 559 days.

(21) Appl. No.: 13/636,881

(22) PCT Filed: Mar. 2, 2011

(86) PCT No.: PCT/JP2011/054697
§ 371 (c)(1),
(2), (4) Date: Sep. 24, 2012

(87) PCT Pub. No.: WO2011/122212
PCT Pub. Date: Oct. 6, 2011

(65) Prior Publication Data
US 2013/0010566 A1    Jan. 10, 2013

(30) Foreign Application Priority Data

Mar. 30, 2010    (JP) ................................. 2010-079553

(51) Int. Cl.
*B29B 7/48*    (2006.01)
*B29C 47/62*    (2006.01)
(Continued)

(52) U.S. Cl.
CPC .......... *B29B 7/482* (2013.01); *B29C 47/6037* (2013.01); *B29C 47/6056* (2013.01);
(Continued)

(58) Field of Classification Search
CPC .... B01F 7/24; B01F 7/00416; B29C 47/0871; B29C 47/768; B29C 47/767;
(Continued)

(56) References Cited

U.S. PATENT DOCUMENTS 3,900,187 A  *  8/1975  Loomans ........................ 366/85
4,746,220 A       5/1988  Sukai et al.
(Continued)

FOREIGN PATENT DOCUMENTS

EP    0532903 A1    3/1993
JP    61-241105 A   10/1986
(Continued)

OTHER PUBLICATIONS

PCT/ISA/210—International Search Report mailed on May 31, 2012, issued in PCT/JP2011/054697.
(Continued)

*Primary Examiner* — Charles Cooley
*Assistant Examiner* — Marc C Howell
(74) *Attorney, Agent, or Firm* — Birch, Stewart, Kolasch & Birch, LLP

(57) ABSTRACT

The kneading apparatus 1 includes a casing 2, a pair of elongated screws 4a, 4b rotatably provided in the casing 2. The screws 4a, 4b are arranged parallel and horizontally with respect to one another. The casing 2 has a main body 20 and a screw container 3 provided in the casing 2. The screw container 3 defines a kneading section 30 therein. The screw 4a includes a screw axis 41 having an outer periphery, a first screw member 42 provided on the outer periphery of the screw axis 41 and a kneading member 43 provided on the outer periphery of the screw axis 41. The first screw member 42 and kneading member 43 are provided in the kneading section 30. The screw 4a, the first screw member 42 and the kneading member 43 respectively have core portions 411, 412, 413 having a surface and outer layers 45 respectively provided on the surfaces of the core portions 411, 412, 413. The screw container 3 and the outer layers 45 are constituted of a nonmetallic material.

11 Claims, 6 Drawing Sheets

(51) Int. Cl.
*B29C 47/60* (2006.01)
*B29C 47/66* (2006.01)

(52) U.S. Cl.
CPC .......... *B29C 47/622* (2013.01); *B29C 47/627* (2013.01); *B29C 47/662* (2013.01)

(58) Field of Classification Search
CPC ............ B29C 47/6037; B29C 47/0803; B29C 47/0808; B29C 47/6056; B29C 47/662; B29B 7/482
USPC ... 366/76.3, 76.4, 79, 85, 133, 266, 318, 75; 425/203
See application file for complete search history.

(56) References Cited

U.S. PATENT DOCUMENTS

| | | | | |
|---|---|---|---|---|
| 4,941,748 | A | * | 7/1990 | Pusch et al. ..................... 366/85 |
| 5,527,106 | A | * | 6/1996 | Zimmerman ................... 366/85 |
| 5,639,159 | A | * | 6/1997 | Sato ................................ 366/75 |
| 6,155,705 | A | * | 12/2000 | Douris et al. ................... 366/79 |
| 6,523,997 | B1 | * | 2/2003 | Cotteverte .......... B29C 47/0808 277/370 |
| 2002/0131328 | A1 | * | 9/2002 | Bowens et al. ............... 366/318 |
| 2008/0063869 | A1 | | 3/2008 | Mortazavi |
| 2009/0258103 | A1 | * | 10/2009 | Williams ............ B29C 47/0808 425/461 |
| 2010/0295207 | A1 | * | 11/2010 | Thewes et al. .......... 264/211.23 |
| 2011/0128812 | A1 | * | 6/2011 | Eckart ................. B29C 47/0801 366/84 |

FOREIGN PATENT DOCUMENTS

| | | |
|---|---|---|
| JP | 2001-219048 A | 8/2001 |
| JP | 2003-39425 A | 2/2003 |
| JP | 2003-275555 A | 9/2003 |
| JP | 2004-351930 A | 12/2004 |
| JP | 2006-167642 A | 6/2006 |
| JP | 2009-61431 A | 3/2009 |
| TW | 221792 B | 3/1994 |
| WO | WO 2009052892 A1 * | 4/2009 |
| WO | WO 2009152936 A2 * | 12/2009 ......... B29C 47/0801 |

OTHER PUBLICATIONS

Notice of Refusal issued Nov. 19, 2013. In Japanese Patent Application No. 2010-079553, with English translation.
Taiwanese Office Action and Search Report, dated Mar. 16, 2015, for Taiwanese Application No. 100108527.

* cited by examiner

KNEADING APPARATUS AND METHOD FOR PRODUCING SEMICONDUCTOR ENCAPSULATING RESIN COMPOSITION

The present invention relates to a kneading apparatus and a method for producing a semiconductor encapsulating (sealing) resin composition.

BACKGROUND OF THE INVENTION

There is known a semiconductor package in which a semiconductor chip (semiconductor element) is covered (encapsulated) with a resin-made encapsulating (sealing) material. The encapsulating material for the semiconductor chip is produced by molding a resin composition (pulverized resin composition) containing a curable resin through, e.g., a transfer molding method.

A process for producing a semiconductor encapsulating resin composition (resin composition) includes a kneading process of kneading a resin composition (a composition) containing plural kinds of pulverized materials. The kneading process is performed after the pulverized materials are mixed. In the kneading process, a kneading extruder such as a single-axis type kneading extruder having a casing and a screw provided in the casing, a double-axis type kneading extruder having a pair of screws, or the like is used (for example, see patent document 1). The casing and the screw(s) of the kneading extruder are constituted of a metallic material.

However, since the casing and the screw of the conventional kneading extruder such as described above are constituted of the metallic material, the conventional kneading extruder suffers from a problem in that metallic foreign substances (foreign metals) are produced from the casing and the screw(s) and then the metallic foreign substances are mixed into the resin composition. As a result, there is a case in that short circuit occurs when the semiconductor chip is encapsulated with the resin composition produced by the conventional kneading extruder.

Patent document 1: JP 2003-275555A

SUMMARY OF THE INVENTION

It is an object of the present invention to provide a kneading apparatus and a method for producing a semiconductor encapsulating resin composition, which are capable of preventing metallic foreign substances from being mixed into a resin composition during the resin composition being kneaded.

In order to achieve the object, one aspect of the present invention is directed to a kneading apparatus for kneading a composition containing plural kinds of pulverized materials, comprising:
a casing including:
a supply port for supplying the composition;
a kneading section for storing the composition supplied through the supply port to knead the composition; and
a discharge port for discharging the composition thus kneaded, and
at least one screw for kneading the composition stored in the kneading section, the screw rotatably provided in the casing, the screw including:
a screw axis having an outer periphery; and
a screw member provided on the outer periphery of the screw axis, the screw member provided in the kneading section,
wherein the screw member provided in the kneading section has a surface and the kneading section has an inner surface, and
wherein at least the surface of the screw member or at least the inner surface of the kneading section is constituted of a nonmetallic material.

In order to achieve the object, another aspect of the present invention is directed to a kneading apparatus for kneading a composition containing plural kinds of pulverized materials, comprising:
a casing including:
a supply port for supplying the composition;
a kneading section for storing the composition supplied through the supply port to knead the composition; and
a discharge port for discharging the composition thus kneaded, and
at least one screw for kneading the composition stored in the kneading section, the screw rotatably provided in the casing, the screw including:
a screw axis having an outer periphery;
a screw member provided on the outer periphery of the screw axis, the screw member provided in the kneading section; and
a kneading member provided on the outer periphery of the screw axis, the kneading member provided in the kneading section,
wherein each of the screw member and the kneading member has a surface and the kneading section has an inner surface, and
wherein at least the surface of the screw member, at least the surface of the kneading member and at least the inner surface of the kneading section are constituted of a nonmetallic material.

In the kneading apparatus of the present invention, it is preferred that a clearance is formed between the inner surface of the kneading section and an outermost portion of the kneading member and the clearance is in the range of 0.5 to 4 mm.

In the kneading apparatus of the present invention, it is preferred that the kneading member has a core portion having a surface and an outer layer provided on the surface of the core portion, and the outer layer of the kneading member is constituted of a nonmetallic material.

In the kneading apparatus of the present invention, it is preferred that the screw axis has a core portion having a surface and an outer layer provided on a part of the surface of the core portion, and the outer layer of the screw axis is constituted of a nonmetallic material.

In the kneading apparatus of the present invention, it is preferred that the screw member has a core portion having a surface and an outer layer provided on the surface of the core portion, and the outer layer of the screw member is constituted of a nonmetallic material.

In the kneading apparatus of the present invention, it is preferred that a clearance is formed between the inner surface of the kneading section and an outermost portion of the screw member and the clearance is in the range of 0.5 to 4 mm.

In the kneading apparatus of the present invention, it is preferred that the screw is detachably provided with respect to the casing.

In the kneading apparatus of the present invention, it is preferred that in the case where a length of the screw axis is defined as L and a diameter of the screw is defined as D, L and D satisfy a relation of $L/D \leq 10$.

In the kneading apparatus of the present invention, it is preferred that the nonmetallic material is a ceramic material.

In the kneading apparatus of the present invention, it is preferred that a Vickers hardness Hv of the ceramic material at 500 gf load is equal to or more than 1300.

In the kneading apparatus of the present invention, it is preferred that a thermal conductivity of the ceramic material is equal to or more than 0.01 cal/(cm·sec·° C.).

In order to achieve the object, another aspect of the present invention is directed to a method for producing a semiconductor encapsulating resin, comprising:

kneading a composition containing plural kinds of pulverized materials using a kneading apparatus of the present invention.

DETAILED DESCRIPTION OF THE PREFERRED EMBODIMENTS

Hereinbelow, a kneading apparatus and a method for producing a semiconductor encapsulating (sealing) resin composition according to the present invention will be described in detail based on the preferred embodiments shown in the accompanying drawings.

First Embodiment

Figure 1:
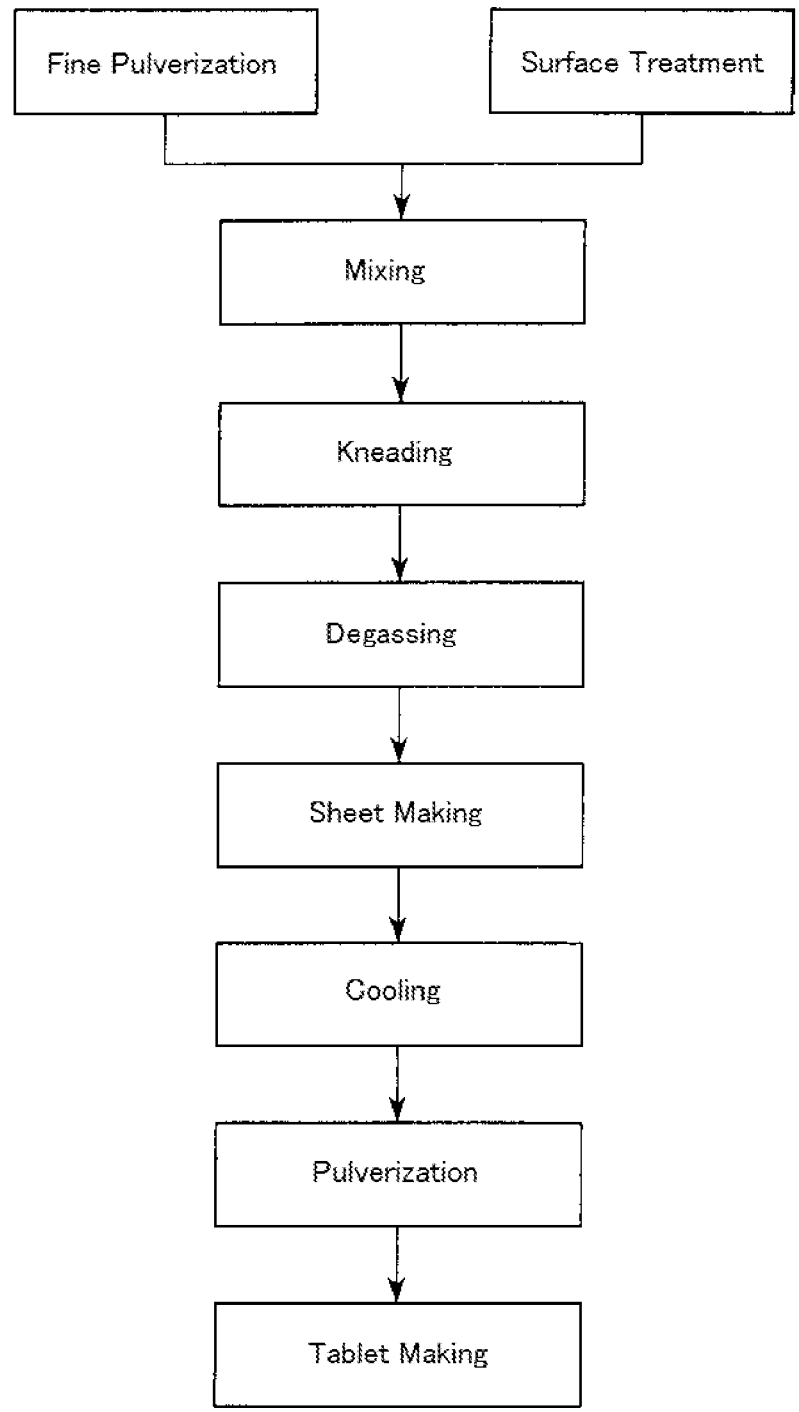
FIG. 1 is a process chart showing a producing process of a resin composition.
Figure 2:
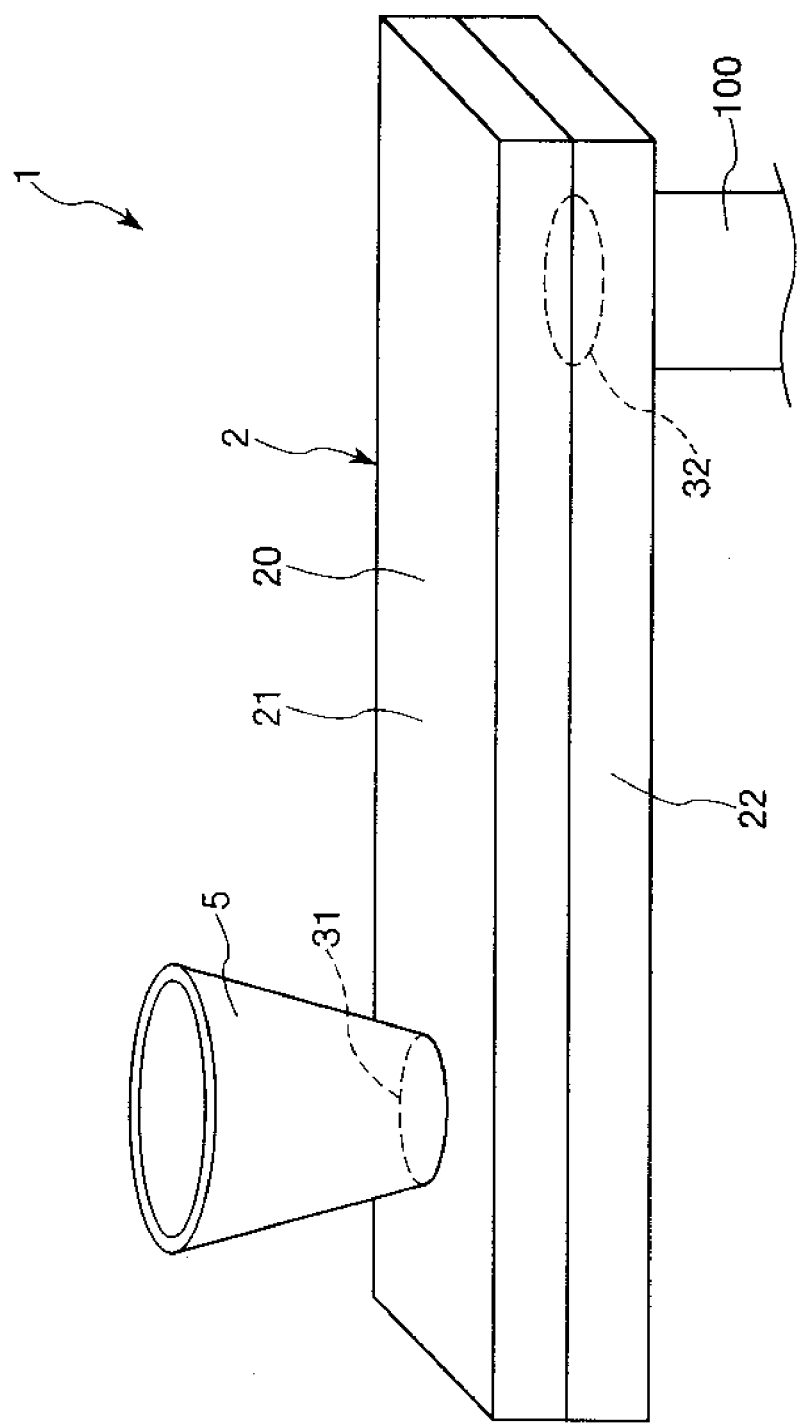
FIG. 2 is a perspective view schematically showing a kneading apparatus according to a first embodiment of the present invention.
Figure 3:
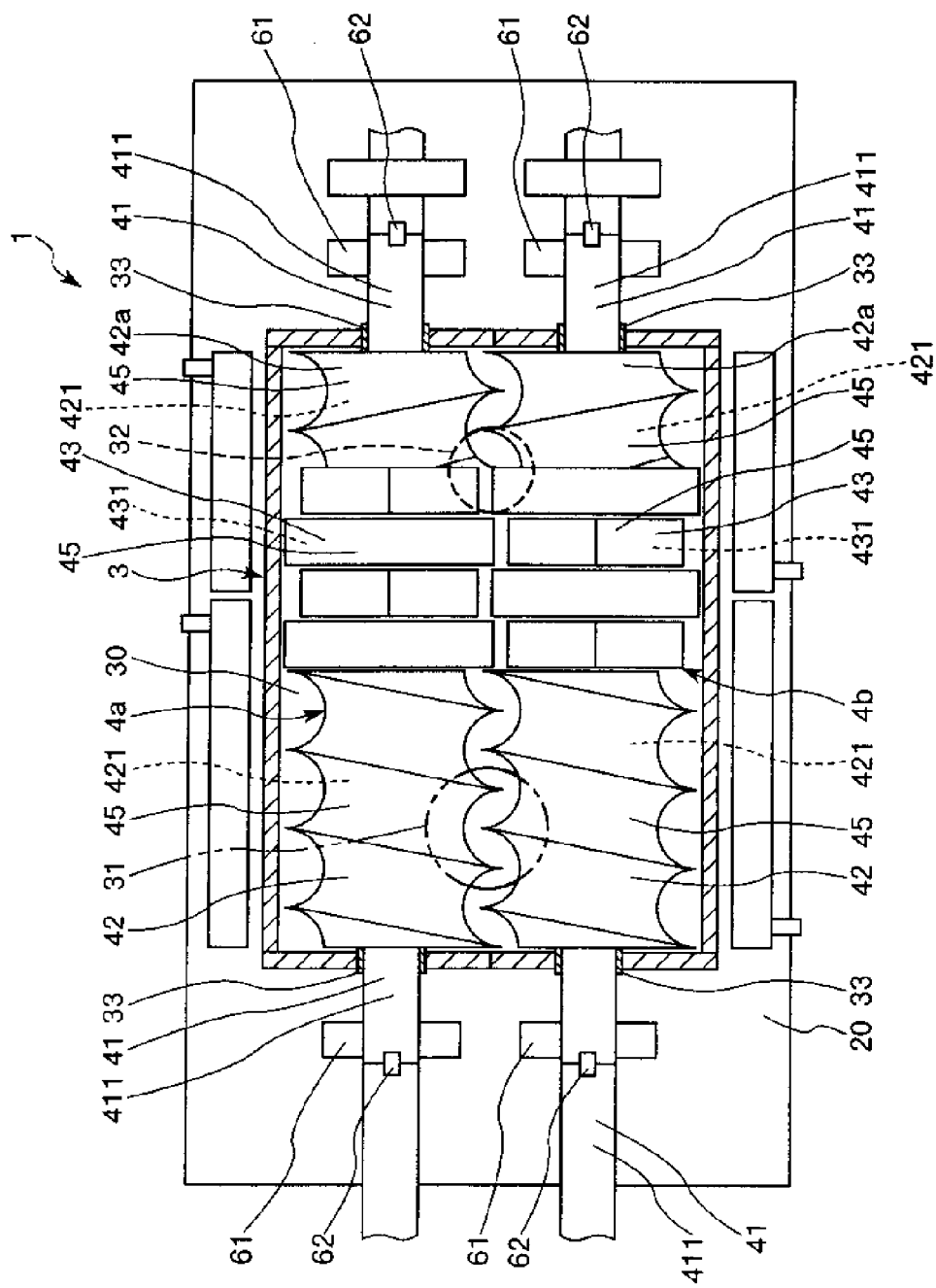
FIG. 3 is a plan view (partial cross section view) schematically showing an inside of the kneading apparatus shown in FIG. 2.
Figure 4:
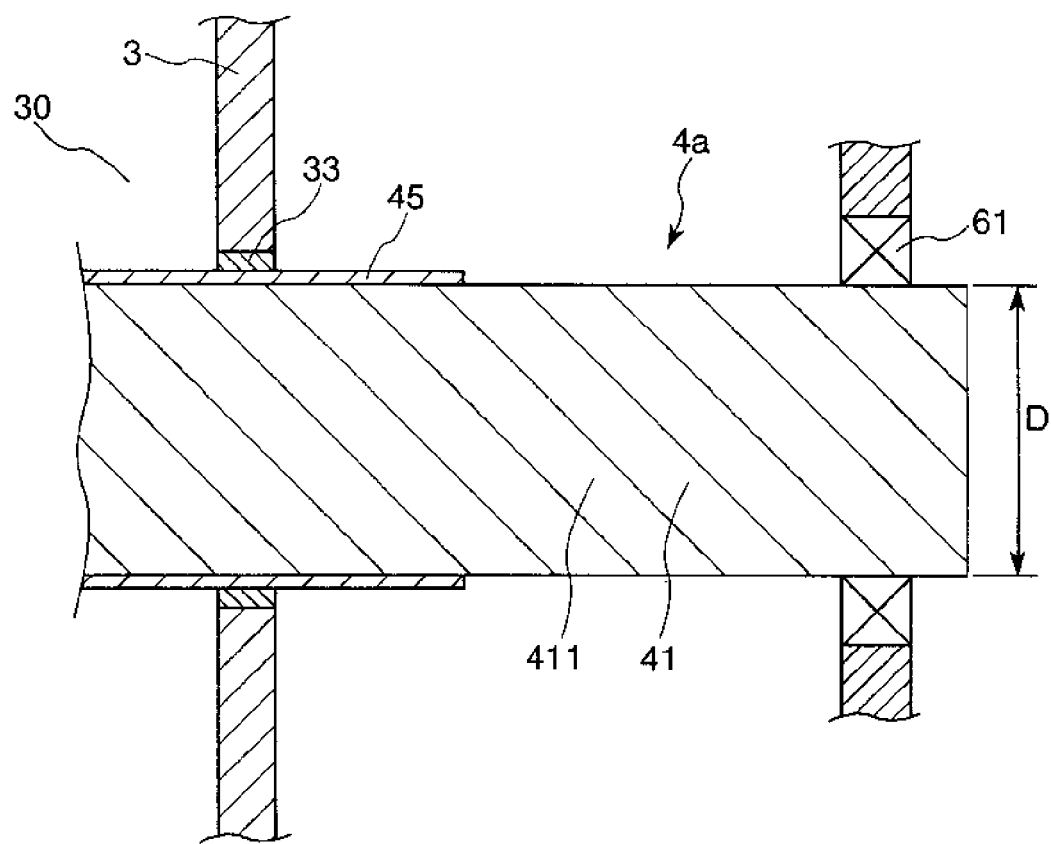
FIG. 4 is a section view showing one end side of the kneading apparatus shown in FIG. 2.
Figure 5:
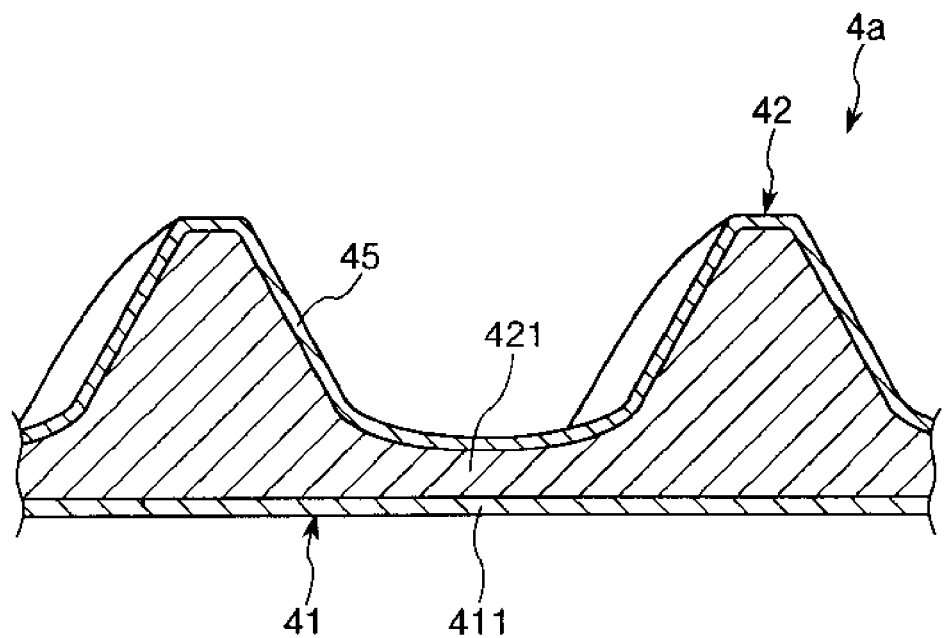
FIG. 5 is a section view showing one configuration example of a screw member of a screw of the kneading apparatus shown in FIG. 2.
Figure 6:
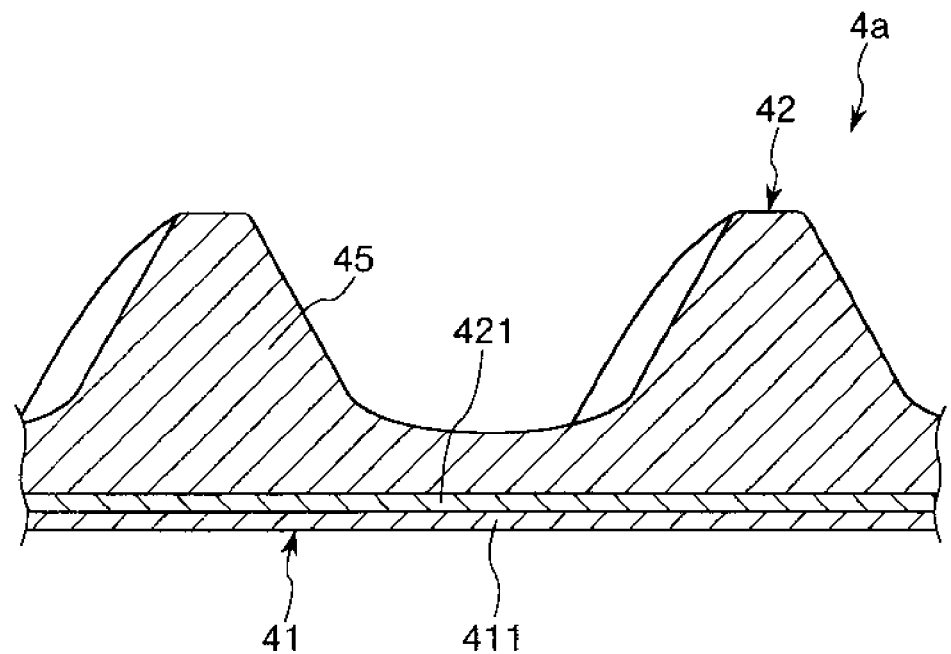
FIG. 6 is a section view showing another configuration example of a screw member of a screw of the kneading apparatus shown in FIG. 2.

FIG. 1 is a process chart showing a producing process of a resin composition. FIG. 2 is a perspective view schematically showing a kneading apparatus according to a first embodiment of the present invention. FIG. 3 is a plan view (partial cross section view) schematically showing an inside of the kneading apparatus shown in FIG. 2. FIG. 4 is a section view showing one end side of the kneading apparatus shown in FIG. 2. FIG. 5 is a section view showing one configuration example of a screw member of a screw of the kneading apparatus shown in FIG. 2. FIG. 6 is a section view showing another configuration example of a screw member of a screw of the kneading apparatus shown in FIG. 2.

In the following description, the upper side of FIGS. 2 through 4 will be referred to as "upper", the lower side will be referred to as "lower", the left side will be referred to as "left" or "upstream" and the right side will be referred to as "right" or "downstream".

A kneading apparatus 1 shown in FIG. 2 is an apparatus used in a kneading process to produce a resin composition as a molded body (compact). Prior to describing the kneading apparatus 1, description will be first given to the overall producing process which begins with the supply of raw materials and ends with the production of a semiconductor encapsulating (sealing) resin composition for covering (encapsulating) a semiconductor chip (semiconductor element).

At first, individual materials as raw materials of a resin composition are prepared. The raw materials include a resin, a curing agent and a filler material (inorganic filler material, fine particle). If necessary, the raw materials may further include a curing accelerator and a coupling agent. It is preferable to use an epoxy resin as the resin.

Examples of the epoxy resin include a cresol novolac type epoxy resin, a biphenyl type epoxy resin, a dicyclopentadiene type epoxy resin, a triphenol methane type epoxy resin, a multi-ring aromatic type epoxy resin and so forth.

Examples of the curing agent include a phenol novolac type resin, a phenol aralkyl type resin, a triphenol methane type resin, a multi-ring aromatic resin and so forth.

Examples of the filler material include a fused silica (having a crushed shape or a spherical shape), a crystalline silica, an alumina and so forth.

Examples of the curing accelerator include a phosphor compound, an amine compound and so forth. Examples of the coupling agent include a silane compound and so forth.

Specific one or more of the materials stated above may be excluded from the raw material. Other materials than set forth above may be further included in the raw materials. Examples of such other materials include a coloring agent, a releasing agent, a stress-reducing agent, a flame retardant and so forth.

Examples of the flame retardant include a borominated epoxy resin, an antimony oxide-based flame retardant, a non-halo- and non-antimony-based flame retardant. Examples of the non-halo- and non-antimony-based flame retardant include an organic phosphor, a metal hydrate, a nitrogen-containing resin and so forth.

(Fine Pulverization)

As shown in FIG. 1, specific materials among the raw materials are first pulverized (finely pulverized) by a first pulverizing apparatus to have a specified particle size distribution. Examples of the raw materials to be pulverized include the resin, the curing agent, the curing accelerator and other materials except the filler materials. A part of the filler materials may be added into the raw materials to be pulverized. As a result, a first composition containing plural kinds of pulverized materials such as the resin powder, the curing agent powder, the curing accelerator powder and so forth is obtained. As the first pulverizing apparatus, it is possible to use a continuous rotary ball mill or the like.

(Surface Treatment)

A specified material among the raw materials, for example, all or part of the filler materials (the remainder of the filler materials), is subjected to a surface treatment. In the surface treatment, for example, the coupling agent is allowed to adhere to surfaces of the filler material (inorganic filter particles). As a result, a second composition containing powder materials of the filler material is obtained. The fine pulverization and the surface treatment may be performed either simultaneously or one after the other.

(Mixing)

Next, the first composition obtained in the fine pulverization process and the second composition obtained in the surface treatment process, namely, a resin composition (a composition) containing the plural kinds of pulverized materials is mixed thoroughly by a mixing device. Each of the pulverized materials contained in the resin composition has a different specific gravity. As the mixing device, it is possible to use a high-speed mixing device having rotary blades, a mixing device having a rotating container or the like.

(Kneading)

Next, the resin composition thus mixed is kneaded by the kneading apparatus 1. The kneading apparatus 1 will be described later.

(Degassing)

Next, the resin composition thus kneaded is degassed by a degassing device.

(Sheet Making)

Next, the resin composition thus degassed is molded into a sheet shape by a sheet-making device. As a result, a sheet shaped resin composition (sheet shaped resin material) is obtained. As the sheet-making device, it is possible to use, e.g., a sheet-making roll.

(Cooling)

Next, the sheet shaped resin composition is cooled by a cooling device. This makes it possible to easily and reliably perform pulverization of the sheet shaped resin composition.

(Pulverization)

Next, the sheet shaped resin composition is pulverized by a second pulverizing apparatus to have a specified particle size distribution. As a result, a pulverized resin composition is obtained. As the second pulverizing apparatus, it is possible to use a hammer mill, a grindstone type mill, a roll crusher or the like.

The granular or pulverized resin composition may be obtained not by the way of the sheet-making, cooling and pulverizing processes but by, e.g., a hot cutting method in which a die having a small diameter is installed in an outlet port of a kneading extruder and then a molten resin composition discharged from the die is cut by a cutter into granular resin composition having a specified length. After obtaining the granular resin composition by the hot cutting method, it is preferable to perform degassing while the temperature of the resin compositions remains high.

(Tablet Making)

Next, the pulverized resin composition is compression-molded by a compact manufacturing device (tablet-making device) to obtain a resin composition in the form of compacts.

The resin composition is used in, e.g., covering (encapsulating) a semiconductor chip (semiconductor element). In other words, the resin composition is molded by, e.g., a transfer molding method and then the semiconductor chip is covered with the molded resin composition as a semiconductor encapsulating material, thus manufacturing a semiconductor package.

The tablet-making process may be omitted and the pulverized resin composition may be used as final products. In this case, the pulverized composition is molded by, e.g., a compression-molding method or an injection-molding method to form a semiconductor encapsulating resin composition.

Next, description will be given to the kneading apparatus 1. As shown in FIGS. 2 through 6, the kneading apparatus 1 is a double-axis type kneading extruder for kneading the resin composition (composition) containing the plural kinds of the pulverized materials. The kneading apparatus 1 includes a casing 2, a pair of elongate screws 4a, 4b rotatably provided in the casing 2. The screws 4a, 4b are arranged parallel and horizontally with respect to one another.

The casing 2 is constituted by detachably connecting an upper member 21 positioned at an upper side of the vertical direction and a lower member 22 positioned a lower side of the vertical direction in FIG. 2. The casing 2 has a main body 20 and a screw container 3 provided in the casing 2. The screw container 3 defines a kneading section 30 for storing the resin composition to knead the resin composition.

The screw container 3 has a cylindrical shape whose both end portions are sealed. A supply port 31 is provided on a left side (upstream side) of an upper surface of the upper member 21 (the screw container 3). The resin composition supplied into the kneading section 30 through the supply port 31 is kneaded in the kneading section 30. A discharge port 32 is provided on a right side (downstream side) of a lower surface of the lower member 22 (the screw container 3). The discharge port 32 may be connected with a supply port of a degassing device 100 for degassing the resin composition thus kneaded.

A constituent material of the main body 20 of the casing 2 is not particularly limited to a specific material. Examples of the constituent materials include various metallic materials such as a stainless steel and so forth.

The screw container 3 is constituted of a ceramic material. The ceramic material is not particularly limited to a specific material. Examples of the ceramic material include an oxide ceramic such as an alumina, a silica, a titania, a zirconia, a yttria or a calcium phosphate, a nitride ceramic such as a silicon nitride, an aluminum nitride, a titanium nitride or a boron nitride, a carbide ceramic such as a tungsten carbide or the like, and a composite ceramic containing a combination of two or more of the above ceramic materials. Among the above ceramic materials, it is preferable to use a ceramic material containing the oxide ceramic.

In the case where the screw container 3 is constituted of the ceramic material (as described later, outer layers of the screws 4a, 4b are also constituted of a ceramic material), it is possible to prevent metallic foreign substances from being mixed into the resin composition during the resin composition being kneaded. As a result, it is possible to prevent short circuit when the semiconductor chip is encapsulated with the resin composition finally produced. In particular, this makes it possible to suppress an amount (increasing ratio) of the metallic foreign substances contained in the resin composition within no more than 1.0 wtppm after the kneading apparatus 1 kneads the resin composition, more specifically no more than 0.1 wtppm, and even more specifically equal to 0 wtppm.

By using the oxide ceramic, which is especially the alumina having a high insulating property and a high abrasion resistance, as a ceramic material (constituent material) of the screw container 3, even if abrasive substances of the screw container 3 are produced by friction between the screw container 3 and the resin composition (kneaded composition) and then the abrasive substances are mixed into the resin composition, it is possible to prevent the short circuit when the semiconductor chip is encapsulated with the resin composition finally produced.

A Vickers hardness Hv of the ceramic material of the screw container 3 at 500 gf load is preferably equal to or more than 1300, more preferably in the range of about 1500 to 1700. This makes it possible to prevent metallic powder (foreign substances) of the constituent material (ceramic material) of the screw container 3 from being mixed into the resin composition during the resin composition being kneaded. Further, even if the abrasive substances of the screw container 3 are produced by the friction between the screw container 3 and the resin composition (kneaded composition) and then the abrasive substances are mixed into the resin composition, it is possible to prevent the short circuit when the semiconductor chip is encapsulated with the resin composition finally produced.

A thermal conductivity of the ceramic material of the screw container 3 is preferably equal to or more than 0.01 cal/(cm·sec·° C.), more preferably in the range of about 0.04 to 0.08 cal/(cm·sec·° C.). This makes it possible to reliably conduct heat generated by a temperature adjusting device described later to the resin composition (kneaded composition). Alternatively, the temperature adjusting device can absorb heat of the resin composition. This makes it possible to stably knead the resin composition.

A thickness of the screw container 3 is not particularly limited to a specific value, but is preferably in the range of about 0.2 to 20 mm, and more preferably in the range of about 0.3 to 10 mm. By setting the thickness of the screw container 3 to fall within the above range, it is possible to prevent the screw container 3 from being broken. Further, even if the ceramic material having a lower thermal conductivity than the thermal conductivity of a metallic material is used as the constituent material of the screw container 3, it is possible to reliably conduct the heat generated by the temperature adjusting device provided outside of the screw container 3 (at an inside of the main body 20 of the casing 2) to the resin composition (kneaded composition).

In the configuration of this embodiment, whole of the screw container 3 is constituted of the ceramic material, but the present invention is not limited thereto. For example, only an inner surface of the screw container 3 may be constituted of the ceramic material. Namely, in the present invention, at least the inner surface of the kneading section 30 is constituted of the ceramic material. In the case where only the inner surface of the screw container 3 is constituted of the ceramic material, a thickness of a ceramic layer is not limited to a specific value, but is preferably in the range of about 0.2 to 20 mm, and more preferably in the range of about 0.3 to 10 mm.

Shaft bearings 61 for rotatably supporting each of the screws 4a, 4b are detachably provided outside of the screw container 3 (the kneading section 30) provided in the casing 2. In this case, the total number of the shaft bearings 61 is four and the shaft bearings 61 are respectively arranged at both sides of the screws 4a, 4b. This makes it possible to attach and detach the screws 4a, 4b together with the shaft bearings 61.

Sealing members 33 for sealing a space between the screw container 3 and the screws 4a, 4b are respectively provided between the screw container 3 and the screws 4a, 4b (provided at contact portions where the screw container 3 touches the screws 4a, 4b). The sealing members 33 are constituted of a nonmetallic material such as an elastic material or the like.

The temperature adjusting device for heating or cooling the resin composition stored in the kneading section during the resin composition being kneaded is provided outside of the kneading section 30 (the screw container 3) provided in the casing 2. In this regard, an area in which a temperature is adjusted by the temperature adjusting device may be separated. A cooling or heating medium for the temperature adjusting device is not limited to a specific material, but examples of the cooling or heating medium include water, oil, inorganic brine, organic brine or so forth.

A tubular supply unit 5 is provided on the left side (upstream side) of the upper surface of the upper member 21 (the screw container 3) so as to be communicated with the supply port 31. An upper end portion of the supply unit 5 is formed into a tapering shape having an inner diameter gradually increasing from a lower side toward an upper side thereof.

Hereinbelow, description will be given to the pair of the screws 4a, 4b. Since structures of the screws 4a, 4b are substantially identical to each other, the screw 4a will be representatively described.

As shown in FIG. 3, the screw 4a has a screw axis 41 having an outer periphery, a first screw member 42 having a first thread direction, a second screw member 42a having a second thread direction oppositely oriented to the first screw direction of the first screw member 42, and a kneading member 43. Each of the first screw member 42, the second screw member 42a and the kneading member is provided on the outer periphery of the screw axis 41. The kneading member 43 can be constituted of a paddle or the like. Each of the first screw member 42, the second screw member 42a and the kneading member 43 may be constituted of a single component or a plurality of components. Further, each of the first screw member 42, the second screw member 42a and the kneading member 43 may be fixed to the screw axis 41 or detachably provided with respect to the screw axis 41.

The kneading member 43 is provided at a right side (downstream side) of the first screw member 42 and the second screw member 42a is provided at a right side of the kneading member 43. By providing the kneading member 43, it is possible to enhance a degree of kneading of the resin composition.

Each of the first screw member 42, the second screw member 42a and the kneading member 43 is provided in the kneading section 30.

Shapes of the first screw member 42 and the second screw member 42a are not limited to a specific shape. For example, each of the first screw member 42 and the second screw member 42a may have a single thread, double threads, triple threads or more threads. Hereinbelow, since structures of the first screw member 42 and the second screw member 42a are substantially identical except the thread direction, the first screw member 42 will be representatively described.

Both end portions of the screw 4a are respectively inserted into the shaft bearings 61 (supported by the shaft bearings 61). As described later, the screw 4a has a core portion 411 having a surface (outer surface) and an outer layer 45 provided on a part of the surface of the core portion 411. In this case, portions of the core portion 411 except the part on which the outer layer 45 is provided (exposed portions of the core portion 411) are respectively inserted into the shaft bearings 61 and supported by the shaft bearings 61. This makes it possible to prevent the supported portions of the screw 4a from being broken.

A motor not shown in the drawings is connected with one (left) end portion side of the screw 4a. This makes it possible to rotate the screw 4a with driving force of the motor. The one end portion of the screw 4a may be detachably connected with the motor by a connecting member 62 such as a coupling or the like.

By rotating the screws 4a, 4b, the resin composition stored in the kneading section 30 can be kneaded and simultaneously delivered to the discharge port 32 by the first screw member 42 and the kneading member 43. Rotational directions of the screws 4a, 4b may be either the same as or differ from each other, but it is preferred that the rotational directions of the screws 4a, 4b are identical to each other. By rotating the screws 4a, 4b in the same rotational direction, it is possible to remove the resin composition remaining on surfaces of the screws 4a, 4b and then deliver the resin composition thus removed to the discharge port 32.

As shown in the FIGS. 3 through 6, the screw axis 41, the first screw member 42 and the kneading member 43 of the screw 4a respectively have core portions 411, 421, 431 having a surface (outer surface) and outer layers 45 respectively provided on the surfaces of the core portions 411, 421, 431.

In this case, the outer layer 45 of the first screw member 42 is provided on whole of the surface of the core portion 421 of the first screw member 42. In a similar way, the outer layer 45 of the kneading member 43 is provided on whole of the surface of the core portion 431 of the kneading member 43.

A shape of the core portion 421 of the first screw member 42 is not particularly limited to a specific shape. For example, the core portion 421 of the core portion 421 may have a shape corresponding to the first screw member 42 (substantially similar shape as the first screw member 42) as shown in FIG. 5 or a shape having an outer surface gradually curved (gradual concave and convex shape) as shown in FIG. 6. The same applies to the core portion 431 of the kneading member 43.

The outer layer 45 of the screw axis 41 is provided on the part of the surface of the core portion 411. In this case, the outer layer 45 of the screw axis 41 is provided at a vicinity of the sealing member 33 for sealing the space between the screw container 3 and the screw 4a.

A constituent material of each of the core portions 411, 421, 431 is not particularly limited to a specific material. Examples of the constituent material include various metallic materials such as a stainless steel and so forth.

The outer layers 45 of the screw axis 41, the first screw member 42 and the kneading member 43 are constituted of a nonmetallic material. As the nonmetallic material, it is preferable to use a ceramic material, a resin material or the like. Among the above nonmetallic materials, it is more preferable to use the ceramic material. The ceramic material may be either the same as the ceramic material of the screw container 3 described above. The ceramic materials of the outer layers 52 and the screw container 3 may have the same composition or the different composition from each other.

A thickness of each of the outer layers 45 is not particularly limited to a specific value, but preferably equal to or more than 0.2 mm, and more preferably in the range of about 0.3 to 60 mm.

Since each of the screws 4a, 4b has the outer layer 45, it is possible to prevent metallic foreign substances from being mixed into the resin composition during the resin composition being kneaded. As a result, it is possible to prevent the short circuit when the semiconductor chip is encapsulated with the resin composition finally produced.

Regarding the screw axis 41, the screw axis 41 is formed from the core portion 411 and the outer layer 45. Thus, even if the resin composition is moved into a space between the outer layer 45 of the screw axis 41 and the sealing member 33, and then friction among them occurs, it is possible to prevent the constituent material of the core portion 411 from being mixed into the resin composition.

In this embodiment, some components of the screw 41, which are the screw axis 41, the first screw member 42 and the kneading member 43, are partially constituted of the nonmetallic material, but the present invention is not limited thereto. For example, whole of each of the first screw member 42 and the kneading member 43 may be constituted of the nonmetallic material.

A clearance is formed between the inner surface of the kneading section 30 and an outermost portion of the first screw member 42. In a similar way, another clearance is formed between the inner surface of the kneading section 30 and an outermost portion of the kneading member 43. These make it possible to prevent the first screw member 42 and the kneading member 43 from scratching the inner surface of the kneading section 30 during the rotation of the screw 4a. As a result, it is possible to prevent metallic powder (foreign substances) of the constituent materials (nonmetallic materials) of the first screw member 42, the kneading member 43 and the screw container 3 from being mixed into the resin composition.

Each of the clearance (which is formed between the inner surface of the kneading section 30 and the outermost portion of the first screw member 42) and the other clearance (which is formed between the inner surface of the kneading section 30 and an outermost portion of the kneading member 43) is preferably in the range of about 0.5 to 4 mm, more preferably in the range of about 2 to 3 mm. This makes it possible to reliably knead the resin composition and simultaneously prevent the first screw member 42 and the kneading member 43 from scratching the inner surface of the kneading section 30.

In the case where a length of the screw axis 41 of the screw 4a is defined as L and a diameter of the first screw member 42 of the screw 4a is defined as D, L/D is preferably equal to or less than 10, more preferably in the range of about 7 to 9. This makes it possible to comparatively reduce an amount of deflection of the screw 4a. As a result, it is possible to prevent the first screw member and the kneading member 43 from scratching the inner surface of the kneading section 30 when the screw 4a is deflected. Therefore, it is possible to prevent the metallic powder of the constituent materials of the first screw member 42, the kneading member 43 and the screw container 3 from being mixed into the resin composition during the rotation of the screw 4a.

Next, description will be given to the kneading process and the operation of the kneading apparatus 1 in the kneading process.

(Kneading Process)

In the kneading process, the kneading apparatus 1 is activated (driven) and then the resin composition containing the plural kinds of the pulverized materials is injected to the supply unit 5. Thus, the resin composition is supplied into the kneading section 30 through the supply port 31.

In the kneading section 30, the resin composition is kneaded and delivered to the discharge port 32 by rotations of the first screw members 42 and the kneading members 43 of the screws 4a, 4b. And then, the resin composition thus kneaded is discharged from the discharge port 32.

Regarding the kneading apparatus 1, at the time when the kneading apparatus 1 is cleaned up, the upper member 21 of the casing 2 is first detached from the lower member 22 of the casing 2. Next, the connecting members 62 respectively provided at the one end portions of the screws 4a, 4b are detached for disconnecting a connection between the screws 4a, 4b and a rotational axis (shaft) of the motor.

Next, the screws 4a, 4b are detached from the casing 2 together with the shaft bearings 61. And then, the screws 4a, 4b and the shaft bearings 61 are cleaned up.

With the kneading apparatus 1, it is possible to prevent metallic foreign substances from being mixed into the resin composition during the resin composition being kneaded and to prevent short circuit when the semiconductor chip is encapsulated with the resin composition finally produced.

Second Embodiment

Figure 7:
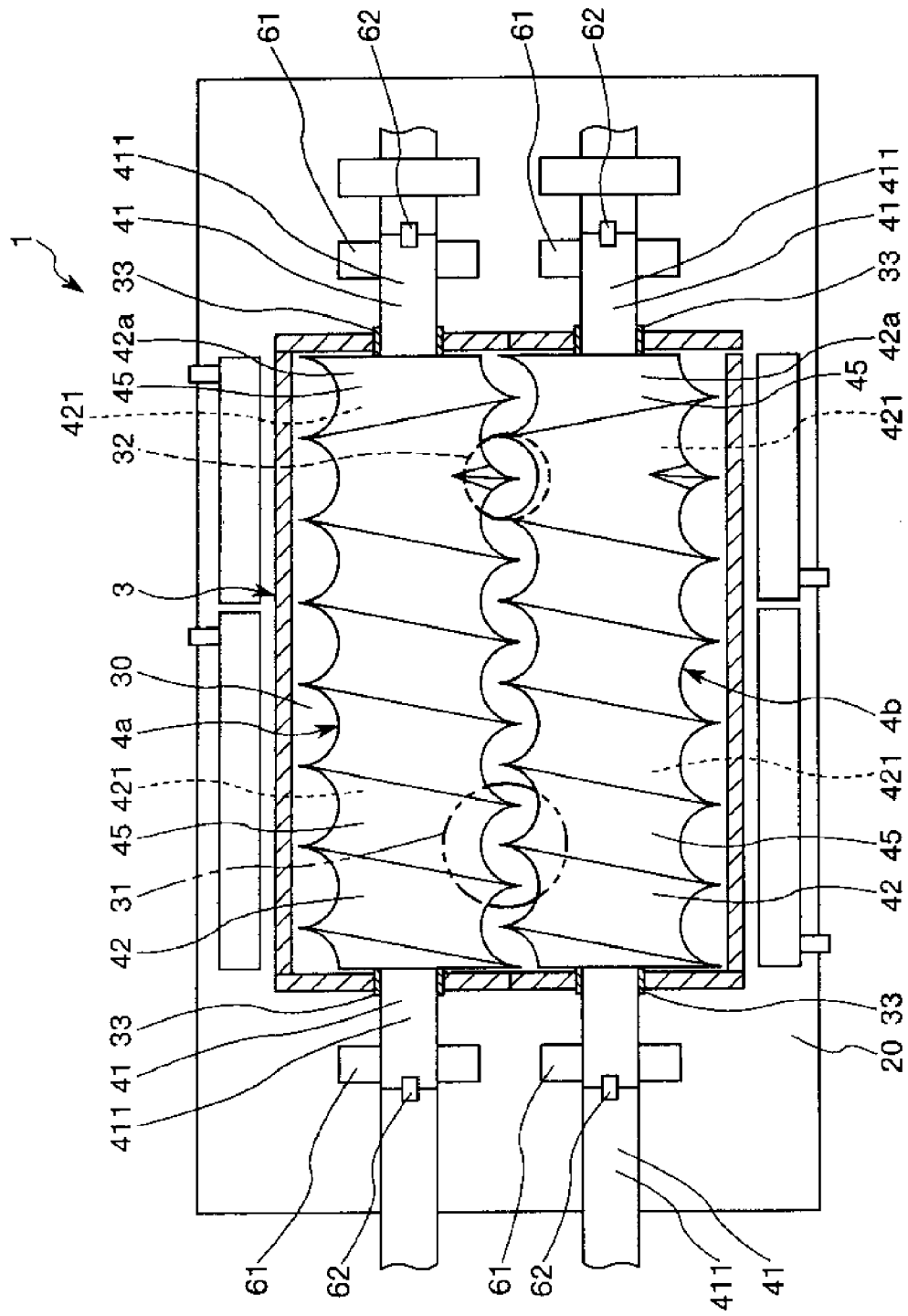
FIG. 7 is a plan view (partial cross section view) showing an inside of a kneading apparatus according to a second embodiment of the present invention.

FIG. 7 is a plan view (partial cross section view) showing an inside of a kneading apparatus according to a second embodiment of the present invention. In the following description, the upper side of FIG. 7 will be referred to as "upper", the lower side will be referred to as "lower", the left side will be referred to as "left" or "upstream" and the right side will be referred to as "right" or "downstream".

Hereinbelow, the second embodiment of the kneading apparatus and the kneading method will be described by placing emphasis on the points differing from the first embodiment of the kneading apparatus and the kneading method, with the same matters omitted from description.

As shown in FIG. 7, in the kneading apparatus 1 according to the second embodiment, the kneading members 43 are omitted. Namely, parts of the first screw members 42 are also provided on the surface of the screw axis 41 on which the kneading members 43 are provided in the first embodiment. The kneading apparatus 1 according to the second embodiment can provide the same result (effect) as the first embodiment described above.

While the descriptions are given to the kneading apparatus and the kneading method according to the present invention shown in the drawings, the present invention is not limited thereto. Each component constituting the kneading apparatus is substituted for an arbitrary component having the same function as it. Further, arbitrary structures or processes also may be added thereto.

Further, the kneading apparatus and the kneading method of the present invention may be made by combining two or more of the arbitrary structures (features) in one of the embodiments described above.

While the number of the screws according to the embodiments described above is two, the present invention is not limited thereto. For example, the number of the screws may be one, two, three or more.

Further, while both the inner surface of the kneading section and the inner surfaces of components of the screws provided in the kneading section are constituted of the ceramic material, the present invention is not limited thereto. For example, one of the inner surface of the kneading section and the inner surfaces of the components of the screws provided in the kneading section may be constituted of the ceramic material.

INDUSTRIAL APPLICABILITY

With the present invention, it is possible to prevent metallic foreign substances (foreign substances) from being mixed into a resin composition during the resin composition being kneaded and to prevent short circuit when a semiconductor chip is encapsulated with the resin composition finally produced. For the reasons stated above, the present invention is industrially applicable.

What is claimed is:

1. A kneading apparatus for kneading a composition containing plural kinds of pulverized materials, said apparatus comprising:
a casing including: a supply port for supplying the composition; an elongated cylindrical kneading section for storing the composition supplied through the supply port to knead the composition and having two pairs of screw axis insertion ports respectively provided in both end portions in a longitudinal direction thereof; a discharge port for discharging the composition thus kneaded; and sealing members respectively provided in the screw axis insertion ports of the kneading section and constituted of an elastic material,
two screws for kneading the composition stored in the kneading section, the two screws rotatably provided in the casing in parallel with each other, each of the two screws including: a screw axis having a core portion having a surface and an outer layer having a thickness of 0.3 to 60 mm and provided on a part of the surface of the core portion; and a screw member provided on the core portion of the screw axis, the screw member provided in the kneading section and having a first screw member and a second screw member oppositely oriented to the first screw member, and
two pairs of shaft bearings for respectively supporting the screw axes of the two screws,
wherein the core portion of the screw axis of each of the two screws is constituted of a metallic material and the outer layer of the screw axis of each of the two screws is constituted of a nonmetallic material,
wherein the screw axes of the two screws are respectively inserted into the two pairs of screw axis insertion ports and are respectively supported by the two pairs of shaft bearings so that the screw axes of the two screws pass through the kneading section in the longitudinal direction of the kneading section,
wherein the two pairs of shaft bearings respectively support the core portions of the two pairs of screw axes,
wherein the sealing members are provided so as to seal spaces between the two pairs of screw axis insertion ports and the outer layers of the screw axes of the two screws,
wherein the kneading section has an inner surface having a thickness of 0.3 to 10 mm and constituted of a nonmetallic material,
wherein the discharge port serves as a connecting portion connected with a supply port of a degassing device for degassing the composition thus kneaded, and
wherein the discharge port is provided between the second screw members of the two screws in planar view and opened toward a lower direction perpendicular to the screw axes of the two screws to supply the composition into the degassing device provided below the discharge port.

2. The kneading apparatus as claimed in claim 1, wherein the screw member of each of the two screws has a core portion provided on the core portion of the screw axis and an outer layer having a thickness of 0.3 to 60 mm and provided on the core portion of the screw member, the core portion of the screw member of each of the two screws is constituted of a metallic material, and the outer layer of the screw member of each of the two screws is constituted of a nonmetallic material.

3. The kneading apparatus as claimed in claim 1, wherein a clearance is formed between the inner surface of the kneading section and an outermost portion of the screw member of each of the two screws and the clearance is in the range of 0.5 to 4 mm.

4. The kneading apparatus as claimed in claim 1, wherein each of the two screws is detachably provided with respect to the casing.

5. The kneading apparatus as claimed in claim 1, wherein in the case where a length of the screw axis of each of the two screws is defined as L and a diameter of the screw is defined as D, L and D satisfy a relation of L/D≤10.

6. The kneading apparatus as claimed in claim 1, wherein the nonmetallic material is a ceramic material.

7. The kneading apparatus as claimed in claim 6, wherein a Vickers hardness Hv of the ceramic material at 500 gf load is equal to or more than 1300.

8. The kneading apparatus as claimed in claim 6, wherein a thermal conductivity of the ceramic material is equal to or more than 0.01 cal/(cm·sec·° C.).

9. A kneading apparatus for kneading a composition containing plural kinds of pulverized materials, said apparatus comprising:
   a casing including: a supply port for supplying the composition; an elongated cylindrical kneading section for storing the composition supplied through the supply port to knead the composition and having two pairs of screw axis insertion ports respectively provided in both end portions in a longitudinal direction thereof; a discharge port for discharging the composition thus kneaded; and sealing members respectively provided in the screw axis insertion ports of the kneading section and constituted of an elastic material,
   two screws for kneading the composition stored in the kneading section, the two screws rotatably provided in the casing in parallel with each other, each of the screws including: a screw axis having a core portion having a surface and an outer layer having a thickness of 0.3 to 60 mm and provided on a part of the surface of the core portion; a screw member provided on the core portion of the screw axis, the screw member provided in the kneading section and having a first screw member and a second screw member oppositely oriented to the first screw member; and a kneading member provided on the core portion of the screw axis and between the first screw member and the second screw member, the kneading member provided in the kneading section, and
   two pairs of shaft bearings for respectively supporting the screw axes of the two screws,
   wherein the core portion of the screw axis of each of the two screws is constituted of a metallic material and the outer layer of the screw axis of each of the two screws is constituted of a nonmetallic material,
   wherein the screw axes of the two screws are respectively inserted into the two pairs of screw axis insertion ports and respectively supported by the two pairs of shaft bearings so that the screw axes of the two screws pass through the kneading section in the longitudinal direction of the kneading section,
   wherein the two pairs of shaft bearings respectively support the core portions of the two pairs of screw axes,
   wherein the sealing members are provided so as to seal spaces between the two pairs of screw axis insertion ports and the outer layers of the screw axes of the two screws,
   wherein the kneading section has an inner surface having a thickness of 0.3 to 10 mm and constituted of a nonmetallic material,
   wherein the discharge port serves as a connecting portion connected with a supply port of a degassing device for degassing the composition thus kneaded, and
   wherein the discharge port is provided between the second screw members of the two screws in planar view and opened toward a lower direction perpendicular to the screw axes of the two screws to supply the composition into the degassing device provided below the discharge port.

10. The kneading apparatus as claimed in claim 9, wherein a clearance is formed between the inner surface of the kneading section and an outermost portion of the kneading member of each of the two screws and the clearance is in the range of 0.5 to 4 mm.

11. The kneading apparatus as claimed in claim 9, wherein the kneading member of each of the two screws has a core portion provided on the core portion of the screw axis and an outer layer having a thickness of 0.3 to 60 mm and provided on the core portion of the kneading member, the core portion of the kneading member of each of the two screws is constituted of a metallic material, and the outer layer of the kneading member of each of the two screws is constituted of a nonmetallic material.

* * * * *